US010475552B2

(12) United States Patent
Izumida et al.

(10) Patent No.: US 10,475,552 B2
(45) Date of Patent: Nov. 12, 2019

(54) STRAND FOR WIRING HARNESS AND WIRING HARNESS (71) Applicant: SUMITOMO ELECTRIC INDUSTRIES, LTD., Osaka-shi (JP)

(72) Inventors: Hiromu Izumida, Itami (JP); Akihisa Hosoe, Osaka (JP); Takumi Akada, Itami (JP); Shinei Takamura, Itami (JP); Katsutoshi Iwamoto, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/348,423

(22) PCT Filed: Jul. 5, 2017

(86) PCT No.: PCT/JP2017/024636
§ 371 (c)(1),
(2) Date: May 8, 2019

(87) PCT Pub. No.: WO2018/092350
PCT Pub. Date: May 24, 2018

(65) Prior Publication Data
US 2019/0272931 A1 Sep. 5, 2019

(30) Foreign Application Priority Data

Nov. 16, 2016 (JP) ................. 2016-222989

(51) Int. Cl.
*H01B 7/02* (2006.01)
*H01B 7/00* (2006.01)
*H01B 13/012* (2006.01)
*C22C 38/00* (2006.01)
*C22C 38/40* (2006.01)
*C22C 38/02* (2006.01)
(Continued)

(52) U.S. Cl.
CPC ......... *H01B 7/0045* (2013.01); *C22C 38/001* (2013.01); *C22C 38/02* (2013.01); *C22C 38/04* (2013.01); *C22C 38/40* (2013.01); *H01B 1/02* (2013.01); *H01B 7/0009* (2013.01); *H01B 13/01209* (2013.01)

(58) Field of Classification Search
CPC .................................... H01B 7/0045
USPC ....................................... 174/72 A
See application file for complete search history.

(56) References Cited

U.S. PATENT DOCUMENTS 4,536,609 A * 8/1985 Neuroth ............. H01B 7/046
174/102 SP
5,353,798 A * 10/1994 Sieben ................. A61B 8/12
128/925

(Continued)

FOREIGN PATENT DOCUMENTS

JP 2004-281241 A 10/2004
JP 02007059123 A * 3/2007
(Continued)

*Primary Examiner* — Stanley Tso
(74) *Attorney, Agent, or Firm* — Baker Botts L.L.P.; Michael A. Sartori (57) ABSTRACT

A strand for a wiring harness includes a first element wire and a second element wire twisted around the first element wire and made of copper or a copper alloy. The first element wire includes a core portion made of stainless steel and a covering layer covering the core portion and made of copper or a copper alloy.

15 Claims, 5 Drawing Sheets (51) Int. Cl.
 *C22C 38/04* (2006.01)
 *H01B 1/02* (2006.01)

(56) References Cited

U.S. PATENT DOCUMENTS

| | | | | |
|---|---|---|---|---|
| 2006/0000634 A1* | 1/2006 | Arakawa | ................... | F21S 8/06 |
| | | | | 174/128.1 |
| 2007/0017691 A1 | 1/2007 | Izumida et al. | | |
| 2014/0091821 A1* | 4/2014 | Shia | ................... | G01R 1/06761 |
| | | | | 324/754.03 |
| 2015/0334834 A1* | 11/2015 | Otomaru | ................. | H01L 23/15 |
| | | | | 174/257 |
| 2019/0160602 A1* | 5/2019 | Santacreu | ............ | B23K 26/342 |

FOREIGN PATENT DOCUMENTS

| | | | |
|---|---|---|---|
| JP | 0201127225 A | * | 6/2011 |
| WO | 2005/024851 A1 | | 3/2005 |

\* cited by examiner

STRAND FOR WIRING HARNESS AND WIRING HARNESS

TECHNICAL FIELD

The present invention relates to a strand for a wiring harness and a wiring harness. This application claims priority to Japanese Patent Application No. 2016-222989 filed on Nov. 16, 2016, and the entire contents of the Japanese Patent Application are incorporated herein by reference.

BACKGROUND ART

Wiring harnesses are used to enable electric power supply, transmission, etc. in mechanical equipment such as automobiles. For example, a wiring harness has a structure in which connectors are disposed at terminal portions of a conducting wire portion made of copper, which is an electric conductor.

A conducting wire portion of a wiring harness requires not only low electrical resistance but also a strength that can ensure durability. Using copper or a copper alloy as a material for a conducting wire portion provides a conducting wire portion with low electrical resistance. However, to provide the conducting wire portion with sufficient strength, the conducting wire portion made of copper or a copper alloy needs to be somewhat thick. This increases the amount of copper used. To address this, strands for wiring harnesses obtained by twisting together a first element wire made of stainless steel and a second element wire made of copper or a copper alloy have been proposed (see, for example, PTLs 1 and 2). These can provide a strand, which reduces the amount of copper used and achieves both strength and conductivity, for a wiring harness.

CITATION LIST

Patent Literature

PTL 1: Japanese Unexamined Patent Application Publication No. 2004-281241
PTL 2: International Publication No. 2005/024851

SUMMARY OF INVENTION

A strand for a wiring harness according to the present invention includes a first element wire and a second element wire twisted around the first element wire and made of copper (Cu) or a copper alloy. The first element wire includes a core portion made of stainless steel and a covering layer covering the core portion and made of copper or a copper alloy.

DESCRIPTION OF EMBODIMENTS

Problems to be Solved by Present Disclosure

In producing a wiring harness, one conducting wire portion and another conducting wire portion may be joined (splice joint method) to form a branch. The joining of the conducting wire portions can be performed, for example, by ultrasonic welding. However, if the strands for wiring harnesses disclosed in PTLs 1 and 2 are used as conducting wire portions, they are disadvantageously difficult to join by ultrasonic welding.

Thus, an object of the present invention is to provide a strand, which is able to reduce the amount of copper used, achieve both strength and conductivity, and facilitate joining by ultrasonic welding, for a wiring harness, and a wiring harness.

Advantageous Effects of Present Disclosure

The above-described strand for a wiring harness can reduce the amount of copper used, achieve both strength and conductivity, and facilitate joining by ultrasonic welding.

Description of Embodiments of Present Invention

First, embodiments of the present invention will be described in sequence. A strand for a wiring harness of the present application includes a first element wire and a second element wire twisted around the first element wire and made of copper or a copper alloy.

The first element wire includes a core portion made of stainless steel and a covering layer covering the core portion and made of copper or a copper alloy.

The present inventors explored the reasons for and solutions to the difficulty of joining the strands for wiring harnesses disclosed in PTLs 1 and 2 by ultrasonic welding. The exploration revealed that joining by ultrasonic welding is difficult because adhesion between the first element wire made of stainless steel and the second element wire made of copper or a copper alloy is weak and thus the element wires are separated (disentangled) from each other due to vibration caused by ultrasonic welding.

The strand for a wiring harness of the present application has a structure in which the first element wire including the core portion made of stainless steel and the second element wire made of copper or a copper alloy are twisted together. Thus, a strand 1 for a wiring harness of the present application can reduce the amount of copper used and achieve both strength and conductivity. In the strand for a wiring harness of the present application, the covering layer made of copper or a copper alloy is formed so as to cover the core portion of the first element wire. This improves adhesion between the first element wire and the second element wire made of copper or a copper alloy. As a result, separation (disentanglement) of the element wires from each other due to vibration caused by ultrasonic welding is suppressed to facilitate joining by ultrasonic welding. Thus, the strand for a wiring harness of the present application can reduce the amount of copper used, achieve both strength and conductivity, and facilitate joining by ultrasonic welding.

In the strand for a wiring harness, a plurality of the second element wires may be twisted so as to surround the outer periphery of the first element wire. This configuration facilitates reduction in the amount of copper used and achievement of both strength and conductivity.

In the strand for a wiring harness, a plurality of the first element wires and a plurality of the second element wires may be twisted together. This configuration also facilitates reduction in the amount of copper used and achievement of both strength and conductivity.

In the strand for a wiring harness, the stainless steel constituting the core portion may be an austenitic stainless steel. This configuration can improve corrosion resistance, electrolytic corrosion resistance, and workability of the strand for a wiring harness.

In the strand for a wiring harness, the austenitic stainless steel may have an MS point, which is a martensitic transformation start temperature, of −400° C. or lower, the MS point being calculated by formula (1).

$$MS=1032-1667\cdot(\% \text{ C}+\% \text{ N})-27.8\cdot\% \text{ Si}-33\cdot\% \text{ Mn}-61\cdot\% \text{ Ni}-41.7\cdot\% \text{ Cr} \quad (1)$$

This can inhibit formation of a strain-induced martensitic phase in the austenitic stainless steel constituting the core portion of the first element wire during a process for producing the strand for a wiring harness. As a result, corrosion resistance, electrolytic corrosion resistance, and workability of the strand for a wiring harness can be more reliably improved. To more reliably inhibit the formation of a strain-induced martensitic phase, the MS point calculated by formula (1) is preferably −700° C. or lower.

In the formula, % C, % N, % Si, % Mn, % Ni, and % Cr mean contents (unit: mass %) of carbon, nitrogen, silicon, manganese, nickel, and chromium, respectively, in the austenitic stainless steel. MS points are expressed in units of ° C.

In the strand for a wiring harness, the first element wire may further include a Ni (nickel) layer disposed between the core portion and the covering layer. This configuration can improve adhesion between the core portion and the covering layer.

In the strand for a wiring harness, the Ni layer may have a thickness of 0.05 μm or more and 5 μm or less. For the function of improving adhesion between the core portion and the covering layer to be reliably achieved, the thickness of the Ni layer is preferably 0.05 μm or more, more preferably 0.2 μm or more, still more preferably 0.3 μm or more, in order to prevent defects such as pinholes. The Ni layer can be formed, for example, by plating. In this case, hydrogen formed as a result of electrolysis of water during plating may embrittle the materials. To shorten the time of plating in order to prevent such embrittlement, the thickness of the Ni layer is preferably 5 μm or less, more preferably 2 μm or less, still more preferably 1 μm or less.

In the strand for a wiring harness, the first element wire may further include, on the surface of the covering layer, at least one selected from the group consisting of a Au (gold) layer, a Ag (silver) layer, and a Sn (tin) layer. This configuration can reduce contact resistance at the outer peripheral surface of the first element wire.

In the strand for a wiring harness, the Au layer, the Ag layer, and the Sn layer may each have a thickness of 0.3 μm or more and 20 μm or less. To reduce variation in thickness, the thicknesses of the Au layer, the Ag layer, and the Sn layer are each preferably 0.3 μm or more.

However, if the Au layer, the Ag layer, and the Sn layer are thicker than necessary, the effect reaches a limit, resulting in an increased production cost. To reduce the production cost, the thicknesses of the Au layer, the Ag layer, and the Sn layer are each preferably 20 μm or less, more preferably 5 μm or less, still more preferably 0.7 μm or less.

In the strand for a wiring harness, a passivation film on the surface of the core portion may have a thickness of 5 μm or less. This configuration allows the covering layer to be easily formed on the surface of the core portion. The thickness of the passivation film on the surface of the core portion can be determined by measuring the thickness of the passivation film at five different points, for example, using a TEM (Transmission Electron Microscope) and calculating the average.

In the strand for a wiring harness, the covering layer may have a thickness of 1 μm or more and 20 μm or less. To more reliably produce the above-described effect of the formation of the covering layer, the thickness of the covering layer is preferably 1 μm or more. However, if the covering layer is thicker than necessary, the effect reaches a limit, resulting in an increased production cost. To reduce the production cost, the thickness of the covering layer is preferably 20 μm or less.

In the strand for a wiring harness, the second element wire and the covering layer may be made of brass, phosphor bronze, a Corson alloy, or beryllium copper. These materials are suitable as a copper alloy constituting the second element wire and the covering layer.

In the strand for a wiring harness, the second element wire and the covering layer may be made of the same material. This configuration further improves adhesion between the first element wire and the second element wire.

In a section perpendicular to the longitudinal direction of the strand for a wiring harness, the area ratio of the first element wire to the second element wire may be 7:3 to 2:8. This configuration facilitates reduction in the amount of copper used and achievement of both strength and conductivity.

The strand for a wiring harness may have a conductivity of 50% IACS (International Annealed Copper Standard) or more and 90% IACS or less. To ensure conductivity sufficient for a conducting wire portion of a wiring harness, the conductivity of the strand for a wiring harness is preferably 50% IACS or more. To ensure sufficient strength, the conductivity of the strand for a wiring harness is preferably 90% IACS or less, more preferably 70% IACS or less.

The strand for a wiring harness may have a tensile strength of 600 MPa or more and 1000 MPa or less. To provide a wiring harness (particularly, a signal wiring harness) with sufficient durability, the tensile strength of the strand for a wiring harness is preferably 600 MPa or more. To improve impact fracture characteristics, the tensile strength of the strand for a wiring harness is preferably 750 MPa or more. To ensure sufficient conductivity, the tensile strength of the strand for a wiring harness is preferably 1000 MPa or less. To ensure sufficient flexibility, the tensile strength of the strand for a wiring harness is more preferably 900 MPa or less.

A wiring harness of the present application includes a first strand and a second strand welded to the first strand. The first strand and the second strand are each the strand for a wiring harness of the present application. The second element wire of the first strand and the second element wire of the second strand are electrically connected together. The wiring harness of the present application has a structure in which the first strand and the second strand easy to join by ultrasonic welding are welded together. This structure can provide a wiring harness that reduces the amount of copper used, achieves both strength and conductivity, and has a branching portion with high joint strength.

Details of Embodiments of Present Invention

Next, embodiments of the strand for a wiring harness and the wiring harness according to the present invention will hereinafter be described with reference to the drawings. In the following drawings, the same or corresponding parts are denoted by the same reference numerals, and a description thereof is not repeated.

First Embodiment

Figure 1:
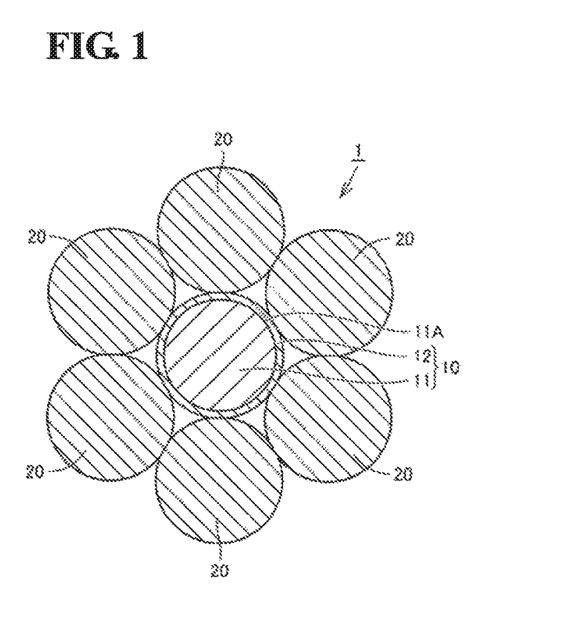
FIG. 1 is a schematic sectional view of a section perpendicular to the longitudinal direction of a strand for a wiring harness according to a first embodiment.
Figure 2:
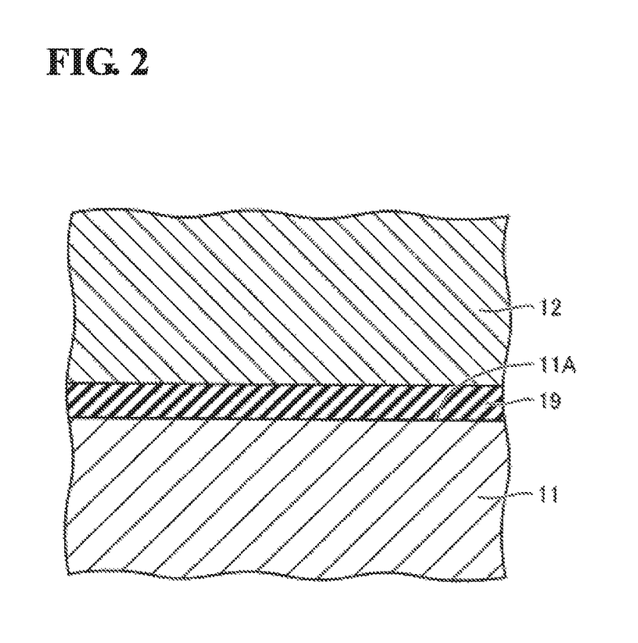
FIG. 2 is a schematic sectional view of the structure of the vicinity of a boundary portion between a core portion and a covering layer.

First, a strand for a wiring harness according to a first embodiment will be described with reference to FIG. 1 and FIG. 2. Referring to FIG. 1, a strand 1 that is the strand for a wiring harness according to the first embodiment includes a first element wire 10 and a second element wire 20 twisted around the first element wire 10 and made of copper or a copper alloy. The first element wire 10 includes a core portion 11 made of stainless steel and a covering layer 12 covering the core portion 11 and made of copper or a copper alloy. The covering layer 12 covers an outer peripheral surface 11A of the core portion 11 so as to be in contact with the outer peripheral surface 11A.

A plurality (six in this embodiment) of the second element wires are twisted together so as to surround the outer periphery of the first element wire 10. The covering layer 12 has a thickness of, for example, 1 μm or more and 20 μm or less. The second element wire 20 and the covering layer 12 may be made of copper (pure copper) or may be made of a copper alloy, such as brass, phosphor bronze, a Corson alloy, or beryllium copper. The second element wire 20 and the covering layer 12 may be made of the same material.

The strand 1 according to this embodiment has a structure in which the first element wire 10 including the core portion 11 made of stainless steel and the second element wire 20 made of copper or a copper alloy are twisted together. Thus, the strand 1 according to this embodiment is a strand, which reduces the amount of copper used and achieves both strength and conductivity, for a wiring harness. In the strand 1 according to this embodiment, the covering layer 12 made of copper or a copper alloy is formed so as to cover the core portion 11 of the first element wire 10. This improves adhesion between the first element wire 10 and the second element wire 20 made of copper or a copper alloy. As a result, separation (disentanglement) of the element wires from each other due to vibration caused by ultrasonic welding is suppressed to facilitate joining by ultrasonic welding. Thus, the strand 1 is a strand, which is able to reduce the amount of copper used, achieve both strength and conductivity, and facilitate joining by ultrasonic welding, for a wiring harness.

In this embodiment, the stainless steel constituting the core portion 11 is an austenitic stainless steel defined in JIS standard. The austenitic stainless steel constituting the core portion 11 has an MS point of preferably −400° C. or lower, more preferably −700° C. or lower, the MS point being calculated by formula (1).

$$MS = 1032 - 1667 \cdot (\%\ C + \%\ N) - 27.8 \cdot \%\ Si - 33 \cdot \%\ Mn - 61 \cdot \%\ Ni - 41.7 \cdot \%\ Cr \quad (1)$$

This can inhibit formation of a strain-induced martensitic phase in the austenitic stainless steel constituting the core portion 11.

Since the core portion 11 is made of stainless steel, a passivation film is formed on the surface of the core portion 11. Referring to FIG. 2, a passivation film 19 lies on the outer peripheral surface 11A of the core portion 11 (between the core portion 11 and the covering layer 12). In the strand 1 according to this embodiment, the passivation film 19 has a thickness of 5 μm or less. This allows the covering layer 12 to be easily formed on the outer peripheral surface 11A of the core portion 11.

In a section perpendicular to the longitudinal direction of the strand 1, the area ratio of the first element wire 10 to the second element wire 20 is preferably 7:3 to 2:8. This facilitates reduction in the amount of copper used and achievement of both strength and conductivity.

The strand 1 preferably has a conductivity of 50% IACS or more and 90% IACS or less. To ensure conductivity sufficient for a conducting wire portion of a wiring harness, the conductivity of the strand 1 is preferably 50% IACS or more. To ensure sufficient strength, the conductivity of the strand 1 is preferably 90% IACS or less, more preferably 70% IACS or less.

The strand 1 preferably has a tensile strength of 600 MPa or more and 1000 MPa or less. To provide a wiring harness (particularly, a signal wiring harness) with sufficient durability, the tensile strength of the strand 1 is preferably 600 MPa or more. To improve impact fracture characteristics, the tensile strength of the strand 1 is preferably 750 MPa or more. To ensure sufficient conductivity, the tensile strength of the strand 1 is preferably 1000 MPa or less. To ensure sufficient flexibility, the tensile strength of the strand 1 is more preferably 900 MPa or less.

Second Embodiment

Figure 3:
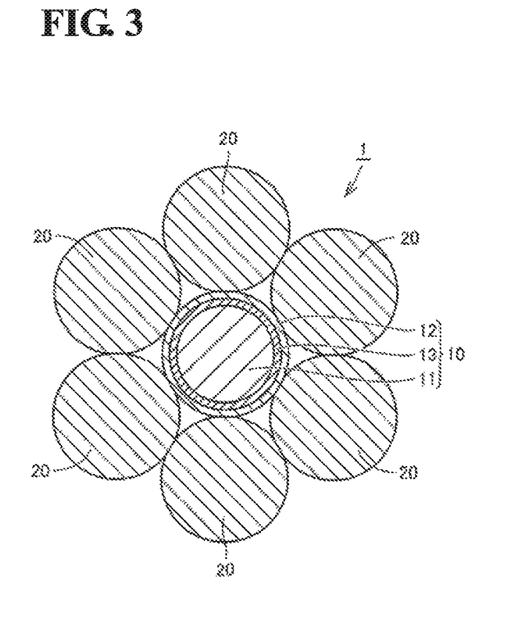
FIG. 3 is a schematic sectional view of a section perpendicular to the longitudinal direction of a strand for a wiring harness according to a second embodiment.

Next, a strand for a wiring harness according to another embodiment, that is, a second embodiment, will be described. Referring to FIG. 3 and FIG. 1, a strand 1 that is the strand for a wiring harness according to the second embodiment basically has the same configuration and produces the same effects as those according to the first embodiment.

However, the strand 1 according to the second embodiment is different from the strand 1 according to the first embodiment in the structure of the first element wire 10.

Referring to FIG. 3, the first element wire 10 of the strand 1 according to the second embodiment further includes a Ni layer 13 disposed between the core portion 11 and the covering layer 12. In this embodiment, the Ni layer 13 has a thickness of 0.2 μm or more and 1 μm or less.

In the strand 1 according to this embodiment, adhesion between the core portion 11 and the covering layer 12 is improved by virtue of the presence of the Ni layer 13 in the first element wire 10.

Third Embodiment

Figure 4:
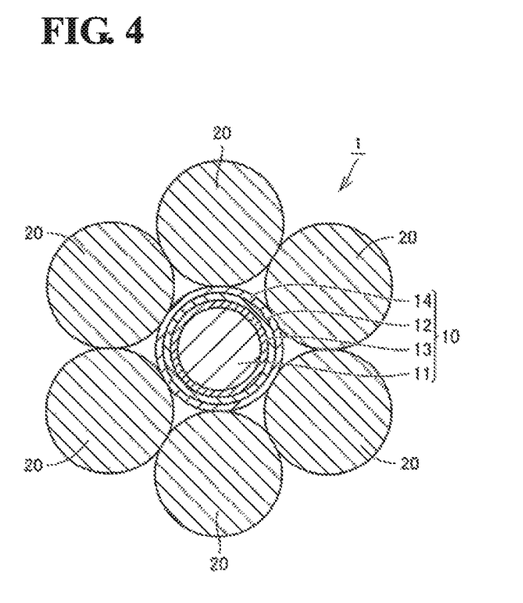
FIG. 4 is a schematic sectional view of a section perpendicular to the longitudinal direction of a strand for a wiring harness according to a third embodiment.

Next, a strand for a wiring harness according to still another embodiment, that is, a third embodiment, will be described. Referring to FIG. 4 and FIG. 3, a strand 1 that is the strand for a wiring harness according to the third embodiment basically has the same configuration and produces the same effects as those according to the second embodiment. However, the strand 1 according to the third embodiment is different from the strand 1 according to the second embodiment in the structure of the first element wire 10.

Referring to FIG. 4, the first element wire 10 of the strand 1 according to the third embodiment further includes, on the surface of the covering layer 12, a second covering layer 14 formed of at least one selected from the group consisting of a Au layer, a Ag layer, and a Sn layer. The Au layer, the Ag layer, and the Sn layer constituting the second covering layer 14 each have a thickness of 0.3 µm or more and 20 µm or less.

In the strand 1 according to this embodiment, contact resistance at the outer peripheral surface of the first element wire 10 is reduced by virtue of the presence of the second covering layer 14 in the first element wire 10.

Fourth Embodiment

Figure 5:
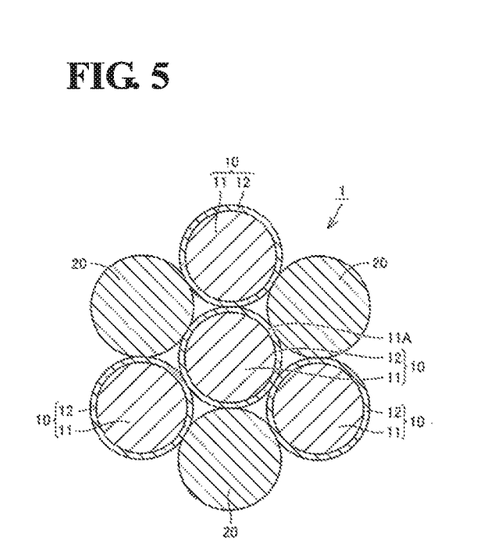
FIG. 5 is a schematic sectional view of a section perpendicular to the longitudinal direction of a strand for a wiring harness according to a fourth embodiment.

Next, a strand for a wiring harness according to still another embodiment, that is, a fourth embodiment, will be described. Referring to FIG. 5 and FIG. 1, a strand 1 that is the strand for a wiring harness according to the fourth embodiment basically has the same configuration and produces the same effects as those according to the first embodiment. However, the strand 1 according to the fourth embodiment is different from the strand 1 according to the first embodiment in the ratio of the number of first element wires 10 to the number of second element wires 20 and in how they are twisted together.

Referring to FIG. 5, in the strand 1 according to the fourth embodiment, a plurality (four) of first element wires 10 and a plurality (three) of second element wires 20 are twisted together. Specifically, in a section perpendicular to the longitudinal direction, one first element wire 10 is disposed at the center. First element wires 10 and second element wires 20, six in total, are alternately disposed in the circumferential direction so as to surround the outer periphery of the first element wire 10 at the center.

The strand 1 according to the fourth embodiment having such a structure can also produce the same effects as those according to the first embodiment.

Fifth Embodiment

Figure 6:
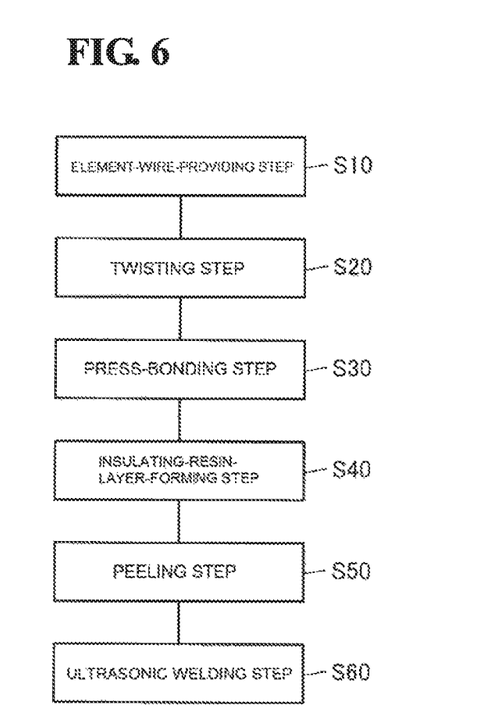
FIG. 6 is a flowchart outlining a method for producing a strand for a wiring harness and a wiring harness.

Next, a wiring harness including the strand 1 according to the first embodiment and a method for producing the wiring harness will be described. FIG. 6 is a flowchart outlining a method for producing a wiring harness having a structure in which two strands 1 are joined together.

Referring to FIG. 6, in the method for producing a wiring harness according to this embodiment, a step (S10), that is, an element-wire-providing step, is first performed. In the step (S10), referring to FIG. 1, a first element wire 10 and second element wires 20 are provided. The second element wires 20 provided are, for example, pure copper wires having a diameter of 0.1 mm to 0.3 mm. The first element wire 10 provided is, for example, a wire including an austenitic stainless steel wire (core portion 11) having a diameter of 0.1 mm to 0.3 mm and a copper plating layer (covering layer 12) formed on the surface of the austenitic stainless steel wire. The austenitic stainless steel wire (core portion 11) may be pickled before performing copper plating so that a passivation film on the surface of the core portion 11 will be thin (e.g., 5 µm or less).

Next, a step (S20), that is, a twisting step, is performed. In the step (S20), the first element wire 10 and the second element wires 20 provided in the step (S10) are twisted together. Specifically, referring to FIG. 1, the first element wire 10 serving as a core wire is disposed at the center, and the six second element wires 20 are disposed so as to surround the outer periphery of the first element wire 10. The six second element wires 20 are then twisted so that the six second element wires 20 extend spirally on the outer peripheral surface of the first element wire 10. As a result, the strand 1 according to the first embodiment is obtained.

Next, a step (S30), that is, a press-bonding step, is performed. In the step (S30), the strand 1 obtained in the step (S20) is radially compressed. Specifically, for example, the strand 1 obtained in the step (S20) is subjected to radial compression processing using a die. The bore of the die is adjusted to be slightly smaller than the outer diameter of the strand 1. Although the step (S30) is not essential, the second element wires 20 and the covering layer 12 of the first element wire are press-bonded together by performing this step. As a result, adhesion between the first element wire 10 and the second element wires 20 is more reliably improved.

Figure 7:
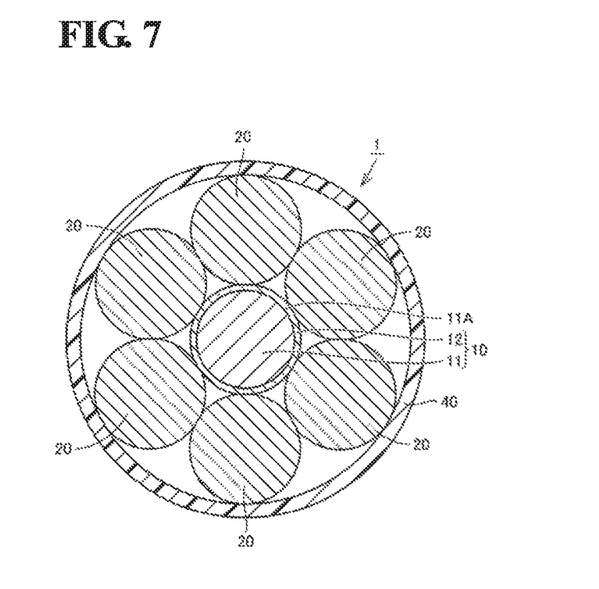
FIG. 7 is a schematic sectional view for illustrating the method for producing a strand for a wiring harness and a wiring harness.

Next, a step (S40), that is, an insulating-resin-layer-forming step, is performed. In the step (S40), referring to FIG. 1 and FIG. 7, an insulating resin layer 40 made of insulating resin is formed so as to cover the outer peripheral surface of the strand 1 obtained by performing the steps (S10) to (S30). As a result, a strand 1 insulated from outside in the radial direction is obtained.

Next, a step (S50), that is, a peeling step, is performed. In the step (S50), a portion of the insulating resin layer 40 formed on the strand 1 obtained by performing the steps (S10) to (S40) is peeled off. Specifically, two strands (a strand 50 and a strand 60) to be joined to each other are first provided (see FIG. 8).

Figure 8:
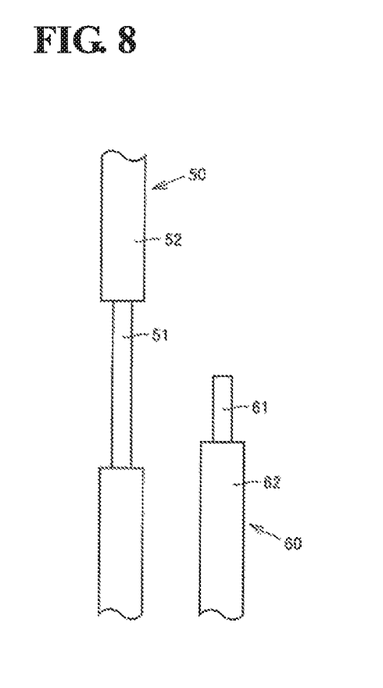
FIG. 8 is a schematic view for illustrating the method for producing a strand for a wiring harness and a wiring harness.

The strand 50 and the strand 60 are each the strand 1 obtained by performing the steps (S10) to (S40). Referring to FIG. 8, the strand 50 includes a conducting wire portion 51 and an insulating resin layer 52 covering the conducting wire portion 51. The strand 60 includes a conducting wire portion 61 and an insulating resin layer 62 covering the conducting wire portion 61. The conducting wire portion 51 and the conducting wire portion 61 each correspond to the strand 1 illustrated in FIG. 1. The insulating resin layer 52 and the insulating resin layer 62 each correspond to the insulating resin layer 40.

Portions of the strand 50 and the strand 60, that is, portions of the insulating resin layer 52 and the insulating resin layer 62 where the strand 50 and the strand 60 will be joined to each other, are then peeled off. In this embodiment, a midway portion of the strand 50 and a terminal portion of the strand 60 are joined together. Thus, a portion of the insulating resin layer 52 at the midway portion of the strand 50 and a portion of the insulating resin layer 62 at the terminal portion of the strand 60 are peeled off. As a result, as illustrated in FIG. 8, the conducting wire portion 51 and the conducting wire portion 61 become exposed respectively at a portion of the strand 50 at which the insulating resin layer 52 has been peeled off and at a portion of the strand 60 at which the insulating resin layer 62 has been peeled off.

Figure 9:
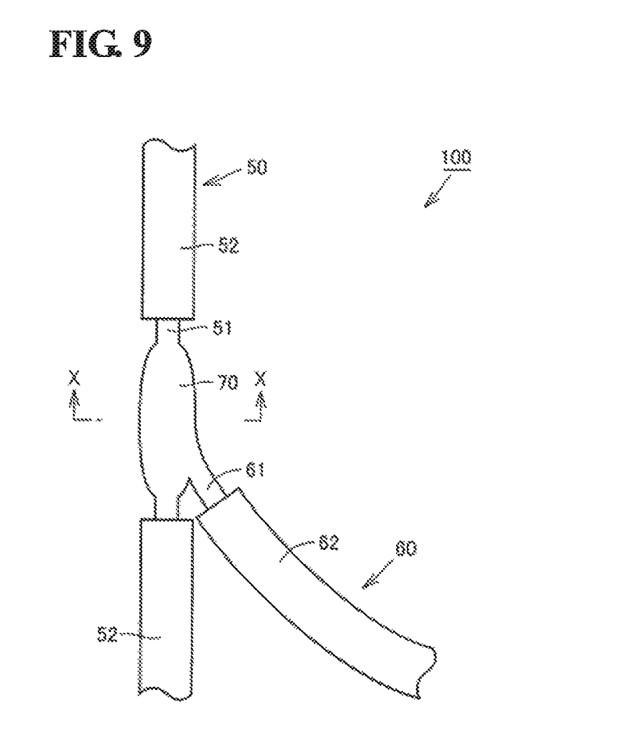
FIG. 9 is a schematic view for illustrating the method for producing a strand for a wiring harness and a wiring harness.
Figure 10:
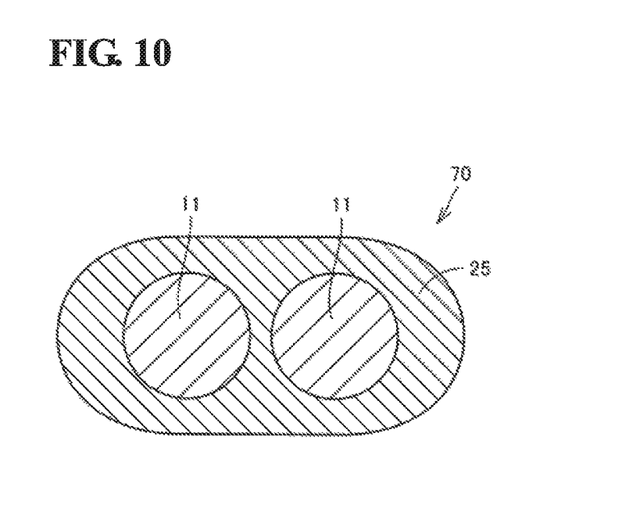
FIG. 10 is a schematic sectional view taken along line X-X in FIG. 9.

Next, a step (S60), that is, an ultrasonic welding step, is performed. In the step (S60), the conducting wire portion 51 and the conducting wire portion 61 that have been exposed by peeling the insulating resin layer 52 and the insulating resin layer 62 in the step (S50) are joined together by ultrasonic welding. Specifically, referring to FIG. 8, the conducting wire portion 51 and the conducting wire portion 61 that have been exposed by peeling the insulating resin layer 52 and the insulating resin layer 62 are kept in contact with each other, while the area of contact between the conducting wire portion 51 and the conducting wire portion 61 is subjected to ultrasonic vibration. As a result, as illustrated in FIG. 9, a welded portion 70 is formed to join the strand 50 and the strand 60 together. Referring to FIG. 10, the welded portion 70 has a structure in which a copper region 25 made of copper derived from the second element wires 20 and the covering layer 12 surrounds the core portion 11 of the strand 50 and the core portion 11 of the strand 60. In the welded portion 70, the second element wires 20 and the covering layer 12 may be completely integrated or may be joined to the extent that the second element wires 20 and the covering layer 12 before being joined are distinguishable. A connector, etc. is then optionally attached to complete a wiring harness 100 according to this embodiment.

The wiring harness 100 according to this embodiment includes the strand 50 and the strand 60 welded to the strand 50. The strand 50 and the strand 60 are each, for example, the strand 1 that is the strand for a wiring harness according to the first embodiment. The second element wires 20 of the strand 50 and the second element wires 20 of the strand 60 are electrically connected together by forming the copper region 25 in the welded portion 70.

The wiring harness 100 according to this embodiment has a structure in which the strand 50 and the strand 60, which are strands 1 easy to join by ultrasonic welding, are welded together. Thus, the wiring harness 100 is a wiring harness that reduces the amount of copper used, achieves both strength and conductivity, and has a branching portion (the welded portion 70) with high joint strength.

While the case where one first element wire 10 and six second element wires 20 are twisted together and the case where four first element wires 10 and three second element wires 20 are twisted together have been described in the first to fourth embodiments, any other number of first element wires 10 and second element wires 20 may be twisted together, and the numbers of first element wires 10 and second element wires 20 twisted together may be freely selected depending on the strength and conductivity required for the intended use. While the case where the Ni layer 13 is formed has been described in the second embodiment and the case where both the Ni layer 13 and the second covering layer 14 are formed has been described in the third embodiment, the second covering layer 14 may be formed without formation of the Ni layer 13.

EXAMPLES

Similarly to the wiring harness 100 according to the fifth embodiment, a sample including two strands 1 joined together by ultrasonic joining was prepared, and experiments for evaluating joint strength were performed. The experimental procedure is as described below.

A first element wire 10 including an austenitic stainless steel wire (core portion 11) having a diameter of 0.15 mm and a pure copper layer (covering layer 12) formed on the surface of the austenitic stainless steel wire by plating and second element wires 20 having a diameter of 0.15 mm and made of pure copper were provided. As in the first embodiment, six second element wires 20 were disposed around one first element wire 10 serving as a core wire, and twisting was performed. The resulting product was then radially compressed by passing it through a die having a through-hole 0.42 mm in diameter, thereby obtaining a strand 1. Two strands 1 were obtained in this manner and joined by ultrasonic welding as in the fifth embodiment to prepare a sample. A welded portion 70 had a length of about 4.0 mm and a thickness of about 0.8 mm. For ultrasonic welding, in-line splice welding was performed using a welding machine of Minic series manufactured by Schunk (Examples). For comparison, a sample was prepared by performing the same procedure except that the formation of the covering layer 12 was omitted (Comparative Example). A tensile test was then performed such that a tensile stress acted on the welded portion 70 along the longitudinal direction to determine a breaking load, whereby joint strength was evaluated.

Experiment 1

First, the influence of the thickness of the covering layer 12 on joint strength was investigated by the above experiment. The conditions and results of the experiment are shown in Table 1.

TABLE 1

|  | Covering layer thickness (µm) | Tensile breaking load (N) |
|---|---|---|
| Example 1 | 1 | 11.3 |
| Example 2 | 3 | 12.6 |
| Example 3 | 5 | 14.3 |
| Example 4 | 10 | 18.0 |
| Example 5 | 20 | 17.6 |
| Comparative Example 1 | 0 | 9.1 |

Referring to Table 1, the tensile breaking strengths of Examples 1 to 5 in which the covering layer 12 was formed were clearly higher than that of Comparative Example 1 in which the covering layer 12 was not formed. In the welded portion of Comparative Example 1, separation of element wires from each other due to vibration caused by ultrasonic welding was observed. This demonstrates that in the strand of the present application in which the covering layer made of copper or a copper alloy is formed, adhesion between the first element wire and the second element wire is improved, and the separation of the element wires from each other is suppressed, thus leading to increased joint strength. The joint strength of Example 1 in which the thickness of the covering layer 12 is 1 µm is clearly higher than that of Comparative Example 1. Thus, it can be said that the thickness of the covering layer 12 is preferably 1 µm or more. Although the tensile breaking strength increases as the thickness of the covering layer 12 increases, the increase in tensile breaking strength has reached a limit at a thickness of 10 µm to 20 µm. The covering layer 12 thicker than necessary results in an increased production cost. Thus, it can be said that the thickness of the covering layer 12 is preferably 20 µm or less.

Experiment 2

Next, the influence of the thickness of a passivation film 19 on the surface of the core portion 11 on joint strength was investigated by the above experiment. The thickness of the passivation film 19 was determined by investigating multiple points on the surface of each core portion 11 using a TEM and calculating the average. The conditions and results of the experiment are shown in Table 2.

TABLE 2

|  | Covering layer thickness (μm) | Thickness of passivation film (nm) | Tensile breaking load (N) |
| --- | --- | --- | --- |
| Example 1 | 1 | 2.1 | 11.3 |
| Example 6 | 1 | 3.8 | 11.8 |
| Example 7 | 1 | 7.8 | 11.0 |
| Example 8 | 1 | 15.3 | 10.5 |
| Example 9 | 1 | 20.0 | 9.8 |

Referring to Table 2, the influence on joint strength cannot be found in Examples 1 and 6 in which the thickness of the passivation film 19 is 5 μm or less. However, the joint strength tends to decrease in Examples 7 to 9 in which the thickness of the passivation film 19 is more than 5 nm. This demonstrates that the thickness of the passivation film 19 is preferably 5 μm or less.

Experiment 3

Next, the influence of the formation of a Ni layer 13 and a second covering layer 14 on joint strength was investigated by the above experiment. The conditions and results of the experiment are shown in Table 3. The names of elements in parentheses given in the "Second covering layer thickness" column in Table 3 indicate elements constituting the second covering layer 14. The Ni layer 13 and the second covering layer 14 were formed by plating.

TABLE 3

|  | Covering layer thickness (μm) | Thickness of Ni layer (μm) | Second covering layer thickness (μm) | Tensile breaking load (N) |
| --- | --- | --- | --- | --- |
| Example 1 | 1 | 0 | 0 | 11.3 |
| Example 10 | 1 | 0 | 1 (Au) | 11.4 |
| Example 11 | 1 | 0 | 1 (Ag) | 10.9 |
| Example 12 | 1 | 0 | 1 (Sn) | 11.3 |
| Example 13 | 1 | 1 | 0 | 12.1 |

Referring to Table 3, the tensile breaking loads of Examples 10 to 13 in which the Ni layer 13 or the second covering layer 14 was formed are comparable to that of Example 1 in which none of these layers was formed. This demonstrates that sufficient joint strength is provided even when the Ni layer 13 or the second covering layer 14 was formed.

It should be understood that the embodiments and examples disclosed herein are illustrative in all respects and not restrictive in any way. The scope of the invention is defined by the claims, rather than by the foregoing description, and all changes that come within the meaning and range of equivalency of the claims are intended to be embraced therein.

REFERENCE SIGNS LIST

1 strand
10 first element wire
11 core portion
11A outer peripheral surface
12 covering layer
13 Ni layer
14 second covering layer
19 passivation film
20 second element wire
25 copper region
40 insulating resin layer
50 strand
51 conducting wire portion
52 insulating resin layer
60 strand
61 conducting wire portion
62 insulating resin layer
70 welded portion
100 wiring harness

The invention claimed is:

1. A strand for a wiring harness, the strand comprising:
a first element wire; and
a second element wire twisted around the first element wire and made of copper or a copper alloy,
wherein the first element wire includes
a core portion made of stainless steel, and
a covering layer covering the core portion and made of copper or a copper alloy,
wherein the stainless steel constituting the core portion is an austenitic stainless steel,
wherein the austenitic stainless steel has an MS point of −400° C. or lower, the MS point being calculated by formula (1):

$$MS=1032-1667 \cdot (\% \text{ C}+\% \text{ N})-27.8 \cdot \% \text{ Si}-33 \cdot \% \text{ Mn}-61 \cdot \% \text{ Ni}-41.7 \cdot \% \text{ Cr} \qquad (1)$$

wherein % C, % N, % Si, % Mn, % Ni, and % Cr are contents (unit: mass %) of carbon, nitrogen, silicon, manganese, nickel, and chromium, respectively, in the austenitic stainless steel.

2. The strand for a wiring harness according to claim 1, wherein a plurality of the second element wires are twisted so as to surround an outer periphery of the first element wire.

3. The strand for a wiring harness according to claim 1, wherein a plurality of the first element wires and a plurality of the second element wires are twisted together.

4. The strand for a wiring harness according to claim 1, wherein the first element wire further includes a Ni layer disposed between the core portion and the covering layer.

5. The strand for a wiring harness according to claim 4, wherein the Ni layer has a thickness of 0.05 μm or more and 5 μm or less.

6. The strand for a wiring harness according to claim 1, wherein the first element wire further includes, on a surface of the covering layer, at least one selected from the group consisting of a Au layer, a Ag layer, and a Sn layer.

7. The strand for a wiring harness according to claim 6, wherein the Au layer, the Ag layer, and the Sn layer each have a thickness of 0.3 μm or more and 20 μm or less.

8. The strand for a wiring harness according to claim 1, wherein a passivation film on a surface of the core portion has a thickness of 5 nm or less.

9. The strand for a wiring harness according to claim 1, wherein the covering layer has a thickness of 1 μm or more and 20 μm or less.

10. The strand for a wiring harness according to claim 1, wherein the second element wire and the covering layer are made of brass, phosphor bronze, a Corson alloy, or beryllium copper.

11. The strand for a wiring harness according to claim 1, wherein the second element wire and the covering layer are made of the same material.

12. The strand for a wiring harness according to claim 1, wherein in a section perpendicular to a longitudinal direction, an area ratio of the first element wire to the second element wire is 7:3 to 2:8.

13. The strand for a wiring harness according to claim 1, wherein the strand has a conductivity of 50% IACS or more and 90% IACS or less.

14. The strand for a wiring harness according to claim 1, wherein the strand has a tensile strength of 600 MPa or more and 1000 MPa or less.

15. A wiring harness comprising:
a first strand; and
a second strand welded to the first strand,
wherein the first strand and the second strand are each the strand for a wiring harness according to claim 1, and
the second element wire of the first strand and the second element wire of the second strand are electrically connected together.

* * * * *